Patented May 1, 1951

2,551,152

UNITED STATES PATENT OFFICE 2,551,152

4-ARYL-PIPERIDYL-(4)-KETONES

Karl Miescher, Riehen, and Hans Kaegi, Basel, Switzerland, assignors to Ciba Pharmaceutical Products, Inc., Summit, N. J.

No Drawing. Original application December 17, 1946, Serial No. 716,888. Divided and this application October 24, 1949, Serial No. 123,305. In Switzerland June 25, 1943

4 Claims. (Cl. 260—294.7)

The present application is a division of application Serial Number 716,888, filed December 17, 1946 (now Patent No. 2,486,796).

The objects of the present invention are 4-aryl-piperidyl-(4)-ketones.

These 4-aryl-piperidines are obtained by causing α-arylated tertiary γ-amino fatty acid nitriles to react with reactive esters of alkylene-1:2-diols in the presence of acid binding agents in one or more steps, converting the nitrile group in the 4-aryl-piperidine-4-carboxylic acid nitriles obtained into a keto group, and splitting off radicals which are suitable for being eliminated and are attached to the cyclic nitrogen at any phase of the reaction.

As starting products there are used therefore α-arylated tertiary γ-amino fatty acid nitriles in which the aryl group may be represented, e. g. by a substituted or unsubstituted phenyl or naphthyl group, the substituents being in any position. The aliphatic radical can be straight or branched or even arranged as part of a ring. For example the following compounds can be used: α-phenyl-γ-(methyl-benzyl-amino)-butyric acid nitrile, α-phenyl-γ-(dimethyl- or diethyl-amino)-butyric acid nitrile, α-(benzyl-oxy- or acyloxy-phenyl)-γ-(methyl-benzyl-amino)-butyric acid nitriles, α-(o-anisyl)-γ-(methyl-diphenylmethyl-amino)-butyric acid nitrile, α-(m-anisyl)-γ-dimethyl-amino-butyric acid nitrile, α-phenyl-γ-(methyl-benzyl-amino)-valeric acid nitrile, α-naphthyl-γ-(dimethyl-amino)-butyric acid nitrile or α-phenyl-α-[o-(methyl-benzyl-amino)-cyclohexyl]-acetic acid nitrile. The above mentioned starting products are in some instances known or can be obtained in a known manner.

For the reaction with the above nitriles the following reactive alkylene-1:2-diol-esters, for example, come into consideration: ethylene-dibromide, ethylene-chlorobromide, ethylene-di-iodide, propylene-1:2-dibromide, propylene-1:2-chloro-bromide, butylene-1:2- or 2:3-dibromide, β-chloro-ethanol-p-toluene-sulfonic acid ester, glycol-di-para-toluene sulfonic acid ester or propane-1:2-diol-dimethane sulfonic acid ester.

The reaction itself is carried out in the presence of acid binding agents. For this purpose the following can be used: sodium, potassium, lithium, calcium, as such or in a form of their alcoholates, amides, hydrides or hydrocarbons, as e. g. potassium-tertiary butylate, potassium-tertiary amylate, sodium amide, sodium hydride, butyl-lithium, phenyl-sodium or phenyl-lithium. It is advantageous to use inert solvents such as, e. g. ether, benzene, toluene, xylene or hexane and to work in the presence of indifferent gases such as nitrogen.

According to the reactivity of the components, the reaction is carried out with cooling, at ordinary temperature or even with heating. It is possible to close the ring in one or more steps.

The nitrile group of the compounds thus obtained may be converted in known manner into a keto group. The obtained piperidines contain a quaternary ring nitrogen atom. They can be converted into such with tertiary nitrogen, for example, by splitting off alkyl halide by heating. The conversion also succeeds easily if there is as a radical attached to the nitrogen, e. g. a mono-, di- or tri-aryl methyl group which can be removed, among others under the influence of catalytically activated hydrogen or by treatment with, e. g. acids or by heating. This conversion can moreover be carried out at any desirable phase of the reaction.

The process is further elucidated by formulae on the basis of the following scheme:

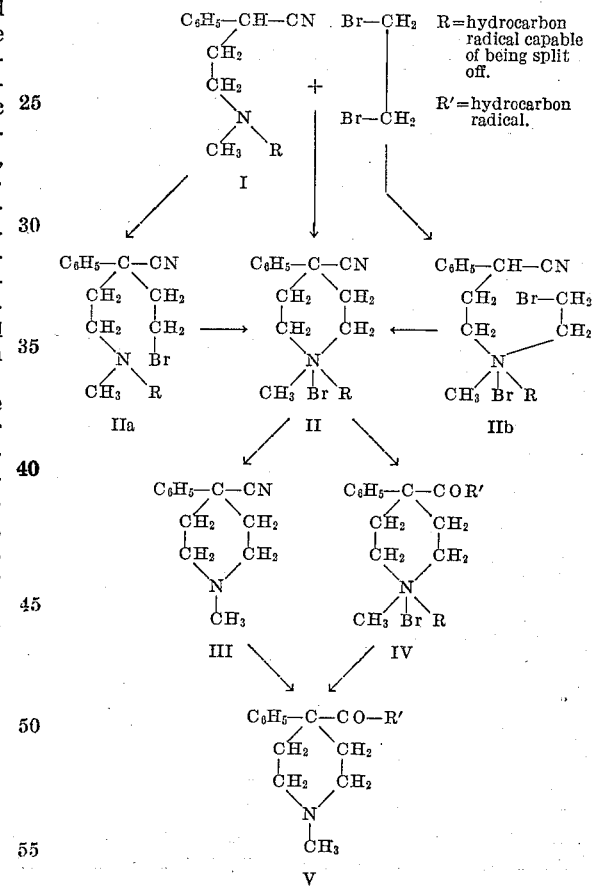

The following examples illustrate the invention, the parts being by weight unless otherwise stated and the relationship of parts by weight to parts by volume being the same as that of the kilogram to the liter:

*Example 1*

6 parts of pulverized sodium in 80 parts by volume of toluene are converted into the phenyl sodium compounds with 13.2 parts of chlorobenzene. 22 parts of α-(meta-methoxy-phenyl)-γ-(dimethylamino)-butyric acid nitrile (yellowish oil of boiling point 184–186° C. under 14 mm. pressure, prepared from meta-methoxy-benzylcyanide, β-dimethylaminoethylchloride and sodium amide) in 30 parts by volume of toluene are added drop by drop. After stirring for 3 hours a yellow green precipitate has separated. 18.8 parts of ethylene-dibromide in 100 parts by volume of toluene are added in drops at +10° C. to maximally 40° C. and the whole is further stirred for 15 hours. By filtering off and washing with ether there are obtained 45 parts of a nearly white powder. This yields on distillation (12 mm. 270–350° C. bath temperature) the 1-methyl-4:4-(meta-methoxyphenyl)-cyano-piperidine as a yellowish oil of boiling point 196–197° C. under 12 mm. pressure which solidifies on standing and then melts at about 40° C., methylbromide being split off from the quaternary compound.

If 1-methyl-4-(meta-methoxyphenyl)-4-cyano-piperidine is caused to react with Grignard compounds, the corresponding ketones are obtained. With n-propyl-magnesium bromide there can be obtained 1-methyl-4-(meta-methoxyphenyl)-piperidyl-(4)-n-propyl-ketone (hydrochloride of melting point 125–127° C.), from which the 1-methyl-4-(meta-hydroxyphenyl)-piperidyl-(4)-n-propyl-ketone (a feebly yellowish oil) is obtained by boiling with hydrobromic acid. 1-methyl-4-(meta-hydroxyphenyl)-piperidyl-(4)-ethyl-ketone hydrobromide of melting point 190–191° C. is obtained in a corresponding manner with ethyl-magnesium bromide.

*Example 2*

The 2:3-dimethoxybenzyl alcohol obtained by catalytic reduction of the 2:3-dimethoxy-benzaldehyde is converted into the 2:3-dimethoxybenzylbromide (boiling point 140–142° C. under 11 mm. pressure) by allowing it to stand with aqueous hydrogen bromide and concentrated sulfuric acid, and this is again converted into the 2:3-dimethoxy-benzylcyanide (oil, boiling point 162–164° C. under 12 mm. pressure) by reaction with potassium cyanide. Phenyl-sodium is then prepared from 20 parts of sodium powder in 200 parts by volume of benzene with 48 parts of chlorobenzene. To this are added 70.8 parts of the 2:3-dimethoxy-benzyl-cyanide and after some time 73.6 parts of β-chloroethyl-methyl-benzyl-amine. The reaction is completed by boiling the mixture for 1 hour in a reflux apparatus. The α-(2:3-dimethoxy-phenyl)-γ-(methyl-benzylamino)-butyric acid nitrile formed can be isolated from the reaction product as a thick oil of boiling point 180–181° C. under 0.1 mm. pressure.

If this nitrile is caused to react according to Example 1 in the presence of phenyl sodium with ethylene-dibromide, there is obtained 1:1-methyl-benzyl-4:4-(2':3'-dimethoxyphenyl)-cyano-piperidinium bromide of melting point 232–233.5° C., from which 1-methyl-4:4-(2':3'-dimethoxyphenyl)-cyano-piperidine-hydro-bromide or the free 1-methyl-4:4-(2':3'-dimethoxy-phenyl)-cyano-piperidine of melting point 94–96° C. can be produced by catalytic hydrogenation.

The quaternary bromide may be converted into a quaternary salt of a ketone by reaction with a Grignard compound, before the benzyl group is split off by hydrogenation. From the salt, the benzyl group may be subsequently removed catalytically by hydrogenation. The procedure is as follows:

43.1 parts by weight of 1:1-methyl-benzyl-4:4-(2':3'-dimethoxy-phenyl)-cyano-piperidinium bromide are ground in a roller mill for 20–22 hours at about 45° C. together with 200 parts by volume of ether and a solution of methyl-magnesium-bromide, prepared from 5 parts by weight of magnesium in 100 parts by volume of ether by the addition of bromoethyl. Upon the addition of a small quantity of ice to the reaction product, ether separates; when evaporated, it leaves no residue. The magnesium sludge is dissolved in 200 parts by volume of water and 55 parts by volume of 5-normal hydrochloric acid and the solution is heated on the waterbath for half an hour. After cooling, the solution is treated with hydrogen with the addition of palladium black and after separation of the resultant toluene the tertiary base is precipitated with ammonia. The 1-methyl-4-(2':3'-dimethoxy-phenyl)-piperidyl-(4)-methylketone is an oil which boils at 145–147° C. under 0.07 mm. pressure. When ethyl-magnesium bromide is used instead of methyl-magnesium bromide, the corresponding ethyl ketone is obtained which melts at 62–64° C. and from n-propyl-magnesium bromide there is obtained the n-propyl ketone of boiling point 147–148.5° C. under 0.07 mm. pressure.

Having thus disclosed the invention, what is claimed is:

1. A 1-lower-alkyl-4-(2':3'-dimethoxy-phenyl)-piperidyl-(4)-lower-alkyl ketone of the formula

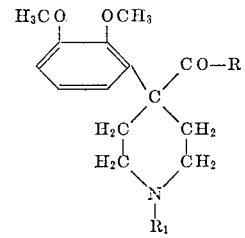

wherein each of R and R₁ represents a lower alkyl group.

2. 1-methyl-4-(2':3'-dimethoxy-phenyl)-piperidyl-(4)-methyl ketone of the formula

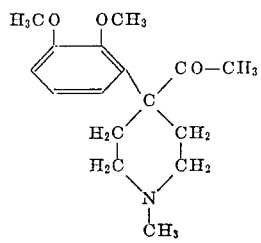

3. 1-methyl-4-(2':3'-dimethoxy-phenyl) - piperidyl-(4)-ethyl ketone of the formula
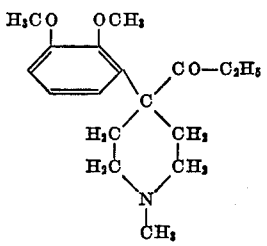
4. 1-methyl-4-(2':3'-dimethoxy-phenyl) - piperidyl-(4)-propyl ketone of the formula
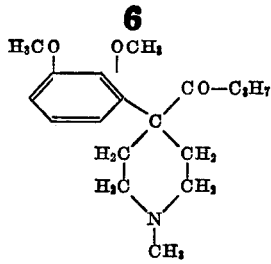
KARL MIESCHER.
HANS KAEGI.
No references cited.